(12) United States Patent
Madaiah

(10) Patent No.: US 9,258,140 B2
(45) Date of Patent: Feb. 9, 2016

(54) ARCHITECTURE FOR ROUTING DATA OF A CUSTOMER NETWORK OVER PROVIDER'S NETWORK IN PROVIDER BACKBONE BRIDGES

(75) Inventor: Vinod Kumar Madaiah, Bangalore (IN)

(73) Assignee: TEJAS NETWORKS LTD, Bangalore, Karnataka (IN)

( * ) Notice: Subject to any disclaimer, the term of this patent is extended or adjusted under 35 U.S.C. 154(b) by 105 days.

(21) Appl. No.: 13/978,144

(22) PCT Filed: Jul. 7, 2011

(86) PCT No.: PCT/IB2011/053017
§ 371 (c)(1),
(2), (4) Date: Jul. 3, 2013

(87) PCT Pub. No.: WO2012/093295
PCT Pub. Date: Jul. 12, 2012

(65) Prior Publication Data
US 2013/0279510 A1    Oct. 24, 2013

(30) Foreign Application Priority Data

Jan. 6, 2011    (IN) ................. 39/CHE/2011

(51) Int. Cl.
*H04L 12/46*    (2006.01)
*H04L 12/723*    (2013.01)
*H04L 12/721*    (2013.01)

(52) U.S. Cl.
CPC ........ *H04L 12/4662* (2013.01); *H04L 12/4658* (2013.01); *H04L 45/502* (2013.01); *H04L 45/68* (2013.01); *H04L 45/50* (2013.01)

(58) Field of Classification Search
CPC ......... H04J 3/247; H04L 45/50; H04L 45/68; H04L 47/825; H04L 12/4633
See application file for complete search history.

(56) References Cited

U.S. PATENT DOCUMENTS

| | | | |
|---|---|---|---|
| 2005/0089047 A1* | 4/2005 | Ould-Brahim et al. .. | 370/395.53 |
| 2007/0195778 A1* | 8/2007 | Tatar et al. ................. | 370/392 |
| 2008/0107120 A1* | 5/2008 | Willhite et al. .......... | 370/395.41 |
| 2008/0172497 A1* | 7/2008 | Mohan et al. ............. | 709/249 |
| 2008/0304476 A1* | 12/2008 | Pirbhai et al. ............. | 370/356 |
| 2009/0097506 A1* | 4/2009 | Subrahmanyan et al. .... | 370/516 |
| 2009/0141629 A1* | 6/2009 | Gerosa et al. ............. | 370/235 |
| 2009/0168783 A1* | 7/2009 | Mohan et al. ............. | 370/395.5 |
| 2009/0232006 A1* | 9/2009 | Mohan et al. ............. | 370/241.1 |
| 2009/0304010 A1* | 12/2009 | Kurebayashi et al. ...... | 370/401 |
| 2010/0002722 A1 | 1/2010 | Porat et al. | |
| 2010/0135302 A1* | 6/2010 | Ra et al. .................... | 370/392 |

FOREIGN PATENT DOCUMENTS

EP    2068471 A1 *    6/2009    ............... H04J 3/06

* cited by examiner

*Primary Examiner* — Hassan Kizou
*Assistant Examiner* — Hector Reyes Ortiz
(74) *Attorney, Agent, or Firm* — Deborah A. Gador

(57) ABSTRACT

Embodiments of the disclosure are related to routing or switching data of a customer network over a provider's network in Provider Backbone Bridge (PBB) to another customer network such that the traffic in the communication channel between the two customer networks is reduced and thus prevents packet loss. The architecture model for routing or switching data of a customer network over a provider's network is a B-component bridge used in backbone networks which performs $\Sigma"1$ data path protection to prevent packet loss, data aggregation for load sharing, TDM (Time Division Multiplexing) to Ethernet Circuit Emulation.

10 Claims, 8 Drawing Sheets

ARCHITECTURE FOR ROUTING DATA OF A CUSTOMER NETWORK OVER PROVIDER'S NETWORK IN PROVIDER BACKBONE BRIDGES

CROSS-REFERENCE TO RELATED APPLICATION

The present application claims priority to Indian patent application serial number 39/CHE/2011 filed on Jan. 6, 2011, and claims the benefit of international application PCT/IB2011/053017 filed Jul. 7,2011, the entire contents of which are incorporated by reference.

TECHNICAL FIELD

The present disclosure relates to networks environment. More particularly, the embodiments of the disclosure relate to routing or switching of data of a customer network over a provider's network.

BACKGROUND OF THE DISCLOSURE

Current Bridging concept and architecture as specified in IEEE standard 802.1Q describe protection switching, connectivity fault management, etc. Metro Ethernet Forum (MEF) describe the abstract level requirements of circuit emulation (E.g. PDH over Metro Ethernet Network in MEF technical specification number 8, MEF 8). There is no prior art for providing zero packet loss with or without load sharing between customer networks using Bridges for TDM streams and/or I-tagged frames over Provider (Backbone) Bridge Network (IEEE 802.1Q) and/or IP/MPLS network as specified in Internet Engineering Task Force's RFCs.

A new architecture for IEEE Bridges, more specifically B-component as specified in IEEE 802.1Q, to enable the above said benefits, but not restricted to these benefits as demonstrated in this disclosure, in a Provider Bridge Network as well as in IP/MPLS networks is proposed.

SUMMARY OF THE DISCLOSURE

This section provides a general summary of the disclosure, and is not a comprehensive disclosure of its full scope or all of its features.

Additional features and advantages are realized through the techniques of the present disclosure. Other embodiments and aspects of the disclosure are described in detail herein and are considered a part of the claimed disclosure.

The embodiments of the present disclosure provide an architecture for routing or switching data of a customer network over a Provider Backbone Bridge (PBB) Network to another customer network such that the traffic in the communication channel between the two customer networks is shared, resiliency of the network is increased and thus preventing packet loss.

In an exemplary embodiment, the disclosure provides Time Division Multiplex (TDM) payload block for creating TDM payload. This payload is tagged with Control word and I-tags. The I-tagged packet is distributed over the paths/tunnels between the two customer networks using appropriate scheduling mechanisms. Ethernet MAC address is prefixed to the I-tagged frames and then sent to the Customer Backbone Port (CBP). Also, the I-tagged packets can be optionally mapped to another I-tag or PW (Pseudo Wire) MPLS label based on gateway requirements while interworking with IP/MPLS networks.

In another exemplary embodiment, the disclosure provides Control Word (CW) block to receive the TDM payload through the bus and perform predetermined operations on the received payload to form frames by adding Circuit Emulated Service (CES) Control Word (Frame format is described in Clause 6, MEF 8) and will also add sequence numbers, and fragmentation ID if frame size is larger than supported by the network.

In one embodiment, the disclosure provides I-tag translator (I-Tag Trans) block which is configured to perform predetermined functions on the frames.

Another exemplary embodiment provides Multi Protocol Label Switching-Transport Profile (MPLS-TP) module to add MPLS-TP tunnel label to the frame and carries data from one customer network to the destined customer network.

In one embodiment, the disclosure provides Scheduler module which is implemented within Multi Protocol Label Switching-Transport Profile (MPLS-TP) module for distributing the frames coming into the MPLT-TP module from the customer network through plurality of virtual MPLS ports implemented over said MPLS-TP and also filtering the frames and thereafter sending or relaying it out of Network Ports (NPs).

In one embodiment, the disclosure provides Scheduler module which is implemented within Customer Backbone port (CBP) for distributing the frames coming into the CBP from the customer network through plurality of virtual instance ports implemented over said CBP and also filtering the frames and thereafter sending or relaying it out of Provider Network Ports (PNPs).

In one embodiment, the description also provides a method of routing or switching data of a customer network over a provider's network in Provider Backbone Bridges (PBBs), said method includes receiving TDM payload from payload block or receiving I-tagged frame from LAN via Customer Port (CP) into a control word block through a bus for adding Circuit Emulated Service (CES) control word to form frames; adding I-tag and corresponding EtherType to the frames; prefixing Ethernet MAC addresses to the I-tagged frames and forwarding it to Customer Backbone Port (CBP) function; optionally mapping the I-tag to PW MPLS label based on gateway requirements; distributing the frames coming into the CBP through plurality of virtual ports; and filtering the frames and thereafter sending it out of Network Ports (NPs) which is provisioned to egress the corresponding tagged frames.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Embodiments of the present disclosure relates to a method of routing or switching data of a customer network over Provider Backbone Bridge Network (PBBN) or IP/MPLS network to another customer network by increasing resiliency to packet loss and to do data-path aggregation for load sharing.

Figure 1:
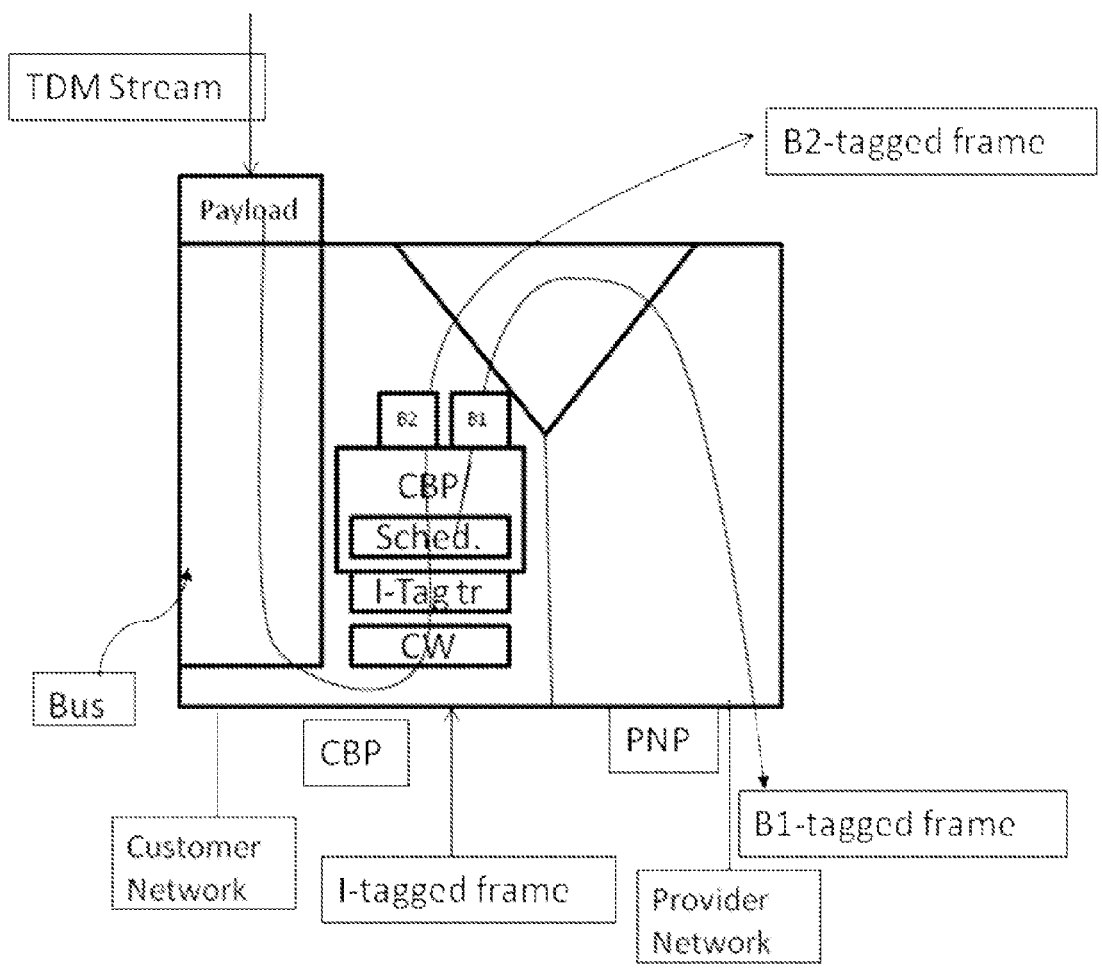
FIG. 1 is an exemplary diagram which illustrates an architecture for routing or switching data of a customer network over a provider's network, in accordance with an exemplary embodiment.

FIG. 1 diagrammatically illustrates the individual components used in the present architecture modeling of the enhanced B-component. B-component is a bridge that is used in backbone networks (IEEE 802.1Q). Enhancement to B-component, it shall be referred as Enhanced B-Component comprises CW (Control Word) block, TDM (Time Division Multiplexing) Payload block, I-Tag Translator block, and Scheduler logic. The triangular/trapezoidal shaped module is provided in the middle of the architecture is an IEEE 802 Relay. The Relay connects two ports such as: CBP (Customer Backbone Port) on the left and PNP (Provider network port) on the right. The combinations of a Relay, a CBP and a PNP form a B-component. It is known that an IEEE 802.1Q based CBP can only receive frames from I-component through a LAN connected at CP. An IEEE 802.1Q based CBP also has I-Tag Translator (I-Tag Translator block) followed by CBP function as shown in FIG. 1. Whereas in the present disclosure the CBP is enhanced with Control Word (CW) function that adds CES (Circuit Emulation Service) control word and also a scheduler that schedules frames. As we are enhancing the architecture of IEEE ports, we shall call CBP and PNP with a new name, Customer Port (CP) and Network Port (NP) respectively. Henceforth CBP and CP (PNP and NP) are interchangeably used when no doubt arises. Assumptions have been made that CBP function is internal to the bridge; CP is a physical port attaching the LAN. CBP function is present inside CP.

In one embodiment, B-component receives an I-tagged frame from I-component through a LAN connected at CP. I-component is another bridge used in backbone network. I-component takes customer's Ethernet frame, may remove S-tag, and map the customer's S-tag to Mag, it further adds plurality of information including but not limiting to Mag, 6-byte backbone sources address and 6-byte backbone destination address (B-DA). B-component change the I-tag and backbone destination MAC address if required and adds a Service-Virtual Local Area Network (S-VLAN) tag to the I-tagged frame. Within the backbone the S-VLAN tag identifies the path taken by the frame. Whereas, the I-tag identify the service quality received by the customer in the backbone network. In order to identify the S-VLAN added by the B-component, it is represented by B-VLAN. The expression B-VLAN is used to distinguish between the S-VLAN added by the customer and to avoid the confusion. Thus S-VLAN tag added by B-component is a B-VLAN tag.

In one embodiment, a CP receives frames from the LAN or from a TDM payload block as shown in the FIG. 1. The Payload block, a module on top of CP creates TDM payload. TDM payload enters the CW via a bus (vertical rectangle on the left of CP). The frame that goes from Relay towards NP is B-tagged frames.

Figure 11:
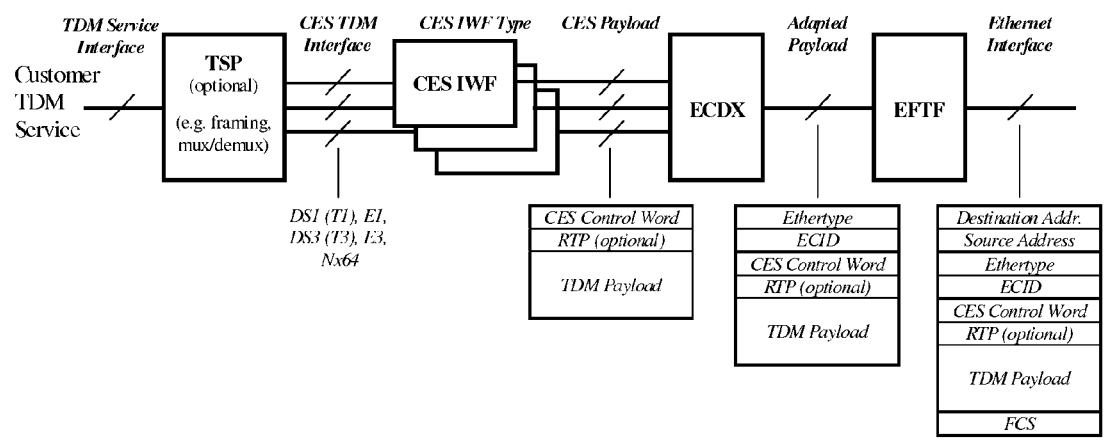
FIG. 11 is an exemplary diagram which illustrates step by step process of converting high bit rate TDM streams into Ethernet Frame, in accordance with an exemplary embodiment.

In one embodiment, the Control word block fragments the frames and adds sequence numbers as illustrated in FIG. 11. The I-Tag Translator block translates the incoming I-SID and Priority Code Point (PCP) contained in the I-tag of the frame received from LAN, will add I-tag and corresponding EtherType if missing as in the case of TDM payload received from top.

In one embodiment, a CBP function includes a scheduler module for performing scheduling function. The CBP have plurality of virtual ports for example ports B1 and B2. These ports are identified by unique identifiers and may be based on IEEE 802.1Q VLAN identifiers. The scheduler distributes the traffic coming into the CBP based on the scheduling algorithm and directs onto the virtual ports. The scheduler looks at the I-SID and then runs unique scheduling algorithm per I-SID. The virtual ports insert a tag corresponding to the virtual ports. For example B1 port inserts a tag identifier, say IEEE 802.1Q based VLAN-tag of value B1, into the frame that flows through and identifies the virtual port. The Relay would filter the frames and send the frames out of the NP that is provisioned to egress the corresponding VLAN-tagged frames. In the FIG. 1, B1-tagged frame is sent out of PNP. B2 tagged frame is sent out of another PNP (not shown in figure).

Figure 9:
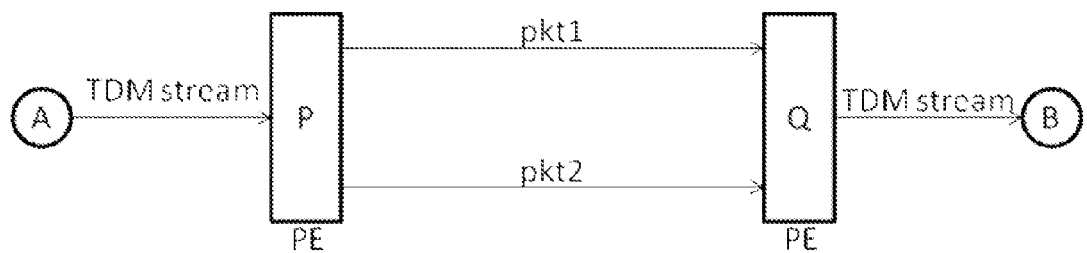
FIG. 9 is an exemplary diagram which illustrates circuit emulation of TDM traffic, in accordance with an exemplary embodiment.
Figure 10:
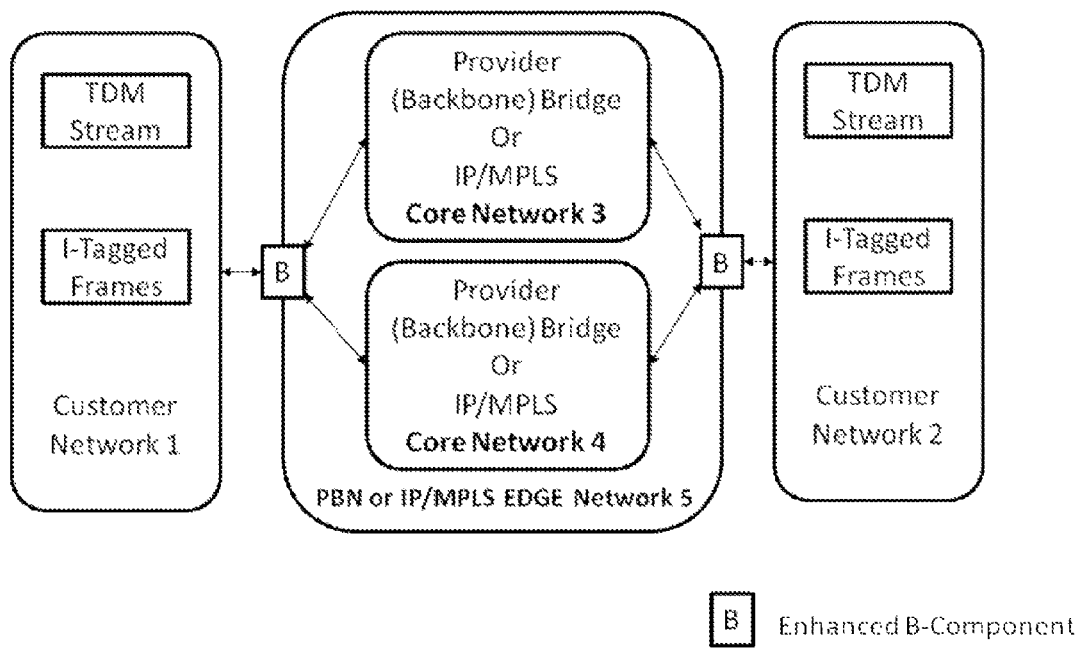
FIG. 10 shows an application scenario for proposed architecture as disclosed in the present disclosure, in accordance with an exemplary embodiment.

In an exemplary embodiment, the B-component is a Bridge in between the customer network and Providers Bridge as shown in FIG. 10. The links connecting the two PE devices to transfer the packets from one customer network to the other could be a set of fibers connecting the NP ports. For example two blocks shown in FIG. 1, one each to represent the PE then it is required to have two NPs on each PE to form topology represented in FIGS. 7, 8 and 9. For N links between the PE, N×NP ports on each PE devices are required.

If one link out of N links fails or gets congested, then traffic may be distributed or load-shared over remaining N−1 links by updating the scheduler weights. A link failure could be detected either using CFM (IEEE 802.1ag) or by loss of signal. Connectivity Fault Management (CFM) is a standard defined by IEEE. It defines protocols and practices for OAM (Operations, Administration, and Maintenance) for paths through 802.1 bridges and local area networks (LANs). However, a path failure could be detected only by using CFM. A link congestion is detected using congestion notification mechanism (IEEE 802.1au) to distribute traffic over N−1 links. That is, if one link out of N links is congested then distribute the traffic over remaining N−1 links. While performing such distribution low priority traffic may be dropped.

Two copies of a packet can be made (as in FIG. 7) if MAC address derived from I-SID is backbone group destination MAC address (B-DA). A Group B-DA frame will be sent to all the virtual ports to which the scheduler is scheduling for a given I-SID. Meaning, each copy of Group B-DA frame will be sent to all those virtual ports that are part of the I-SID. So each copy will be tagged with B1 and B2, respectively and go out of the respective NP ports. At the receiver, one of the several copies will be dropped by the CW function. CW function maintains next sequence number counter. If older or duplicate sequence number is encountered, it will get dropped.

In one embodiment, MPLS TP module is provided with the architecture as described above to transmit and receive the frames having MPLS label in IP/MPLS edge network. The MPLS TP arrangement in the architecture is diagrammatically illustrated in FIG. 2. As discussed earlier, CP receives the frame from LAN or the TDM stream through the BUS. The Control word block fragments the received frames and adds sequence numbers. Since the transmission is happening over MPLS edge network, it is required to add PW MPLS label to incoming frame as the MPLS edge network understands only frames having PW MPLS label. Therefore, I-SID translator block maps the I-tag to PW MPLS tag depending on gateway requirement. Now, PW MPLS tagged frame is distributed through virtual ports for example B1 and B2 using the same technique as discussed earlier in the explanation to FIG. 1.

Figure 2:
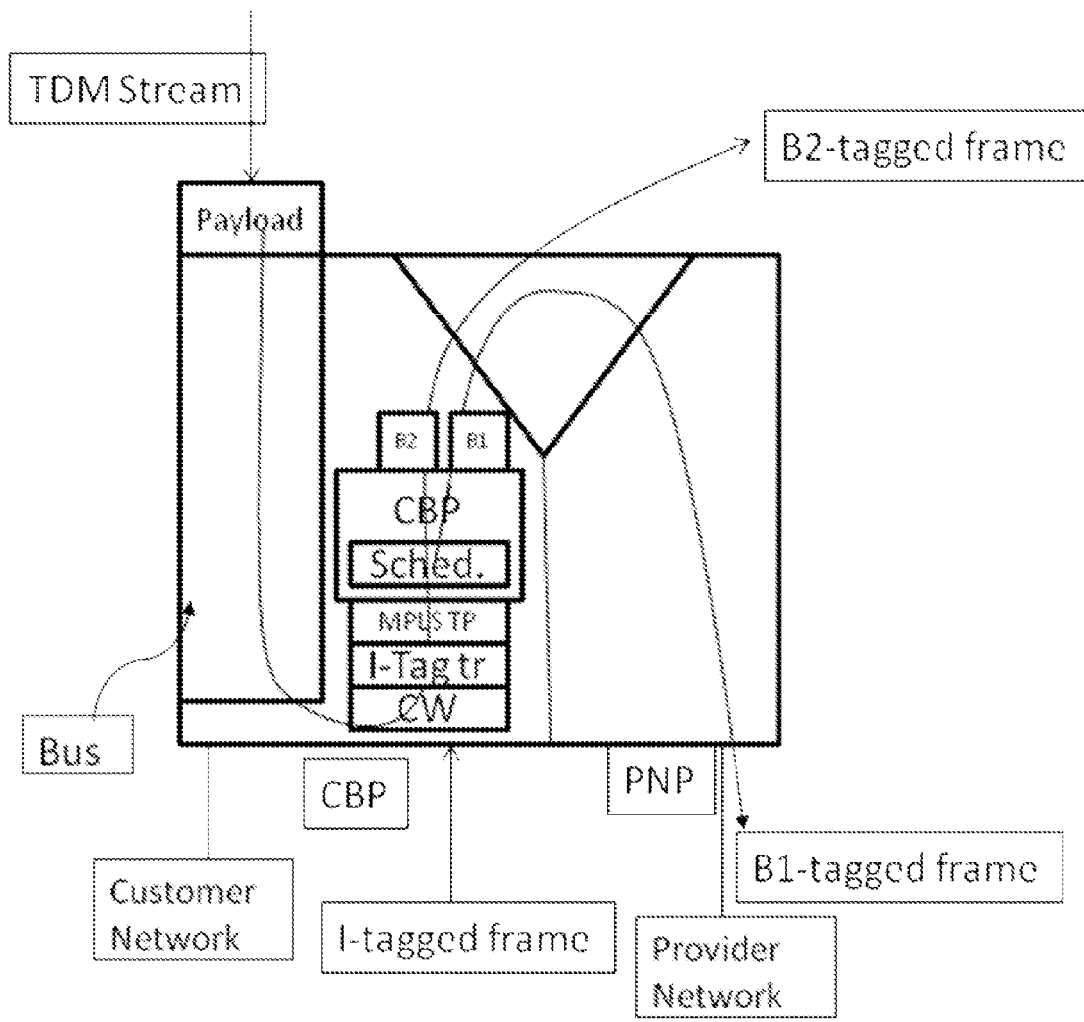
FIG. 2 is an exemplary diagram which illustrates MPLS-TP Gateway function on PBB, in accordance with an exemplary embodiment.

FIG. 2 diagrammatically illustrates the individual components used in the enhanced architecture modeling B-component which comprises of MPLS TP (Multiprotocol Label Switching with Transport Profile) block in addition to the other blocks as shown in FIG. 1. The I-Tag Translator block in this enhanced B-component will map I-tag to PW (Pseudo Wire) MPLS Label (also called as VC Label) depending on gateway requirements. If the enhanced B-Component is connected to router or device that understands PW MPLS tagged frame then the operator will enable mapping I-tag to PW MPLS label. Furthermore, the MPLS-TP Gateway function is added in addition to PW Gateway function. If the enhanced B-Component is connected to router or device that understands MPLS-TP tagged frame then the MPLS-TP gateway function is enabled. The MPLS-TP Gateway function will have a module called MPLS-TP module that is ON all the time. MPLS-TP module adds the MPLS-TP tunnel label. MPLS tunnel label is IETF RFC-based 32 bits label. The distribution of the bits is provided below:

20 bit tunnel label
3 bits with value zero
1 bit denoting bottom of the stack bit. If the value is 1, then the label is bottom label
8 bit TTL PW MPLS format is:
|VC Label|12 reserved bits)

PW MPLS label is IETF RFC-based 32 bits label where, 20 bit is assigned for VC label (A label that identifies the virtual circuit), also called as VCID, and 12 bit is reserved.

In one embodiment, I-Tag Translator function in the B-component maps I-SID to VCID without loss of information. This is possible because I-SID is 24 bits and VC Label is 20 bits. I-SID is a superset.

Whenever such translation is done, the EtherType should also be appropriately changed. I-tag has ethertype of 88e7. PW MPLS tag has EtherType of 8847

By supporting Pseudo Wire Emulation on the B-component one can simply handoff PW MPLS tag from the Carrier Ethernet platform to the router. Pseudo Wire Emulation poses some requirements on the routers such as, need of PWE (Pseudo Wire Emulation as mentioned in IETF standard, a well known concept) proxy, In-band SNMP (Simple Network Management Protocol) commands to configure PW labels (VCID) from NMS, Support for OAM (Operation Administration and management) on Carrier Ethernet platform and PE router, Dry martini or Pseudo Wire Emulation support at the ingress of PE router, PW label translation support at the PE router (which is optional); if VCID is negotiated between the B-comp and PE router then the router should be able to use the same PW label sent by the Gateway.

Figure 3:
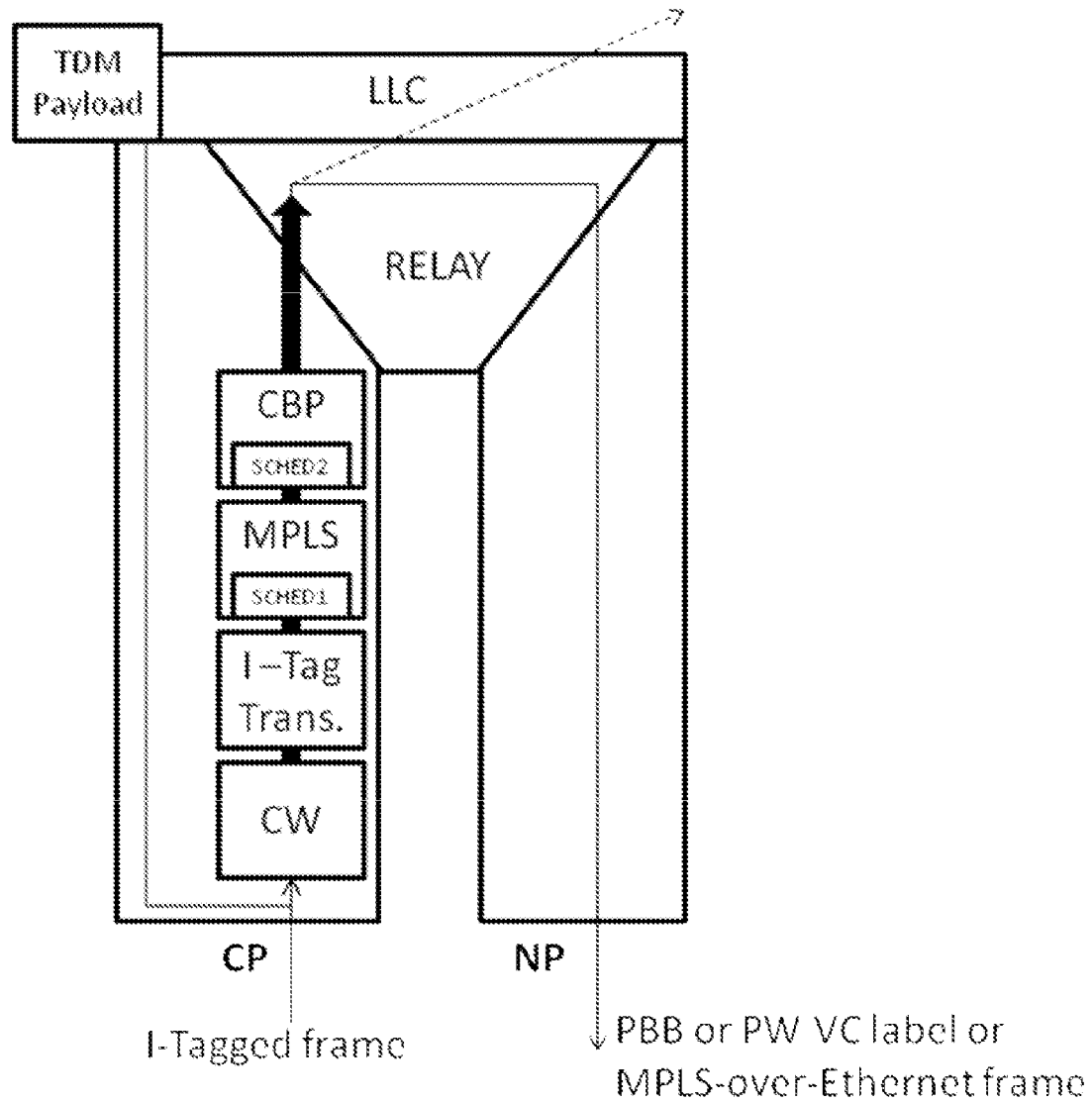
FIG. 3 is an exemplary diagram which shows arrangement of both CBP module and MPLS module on CP, in accordance with an exemplary embodiment.
Figure 4:
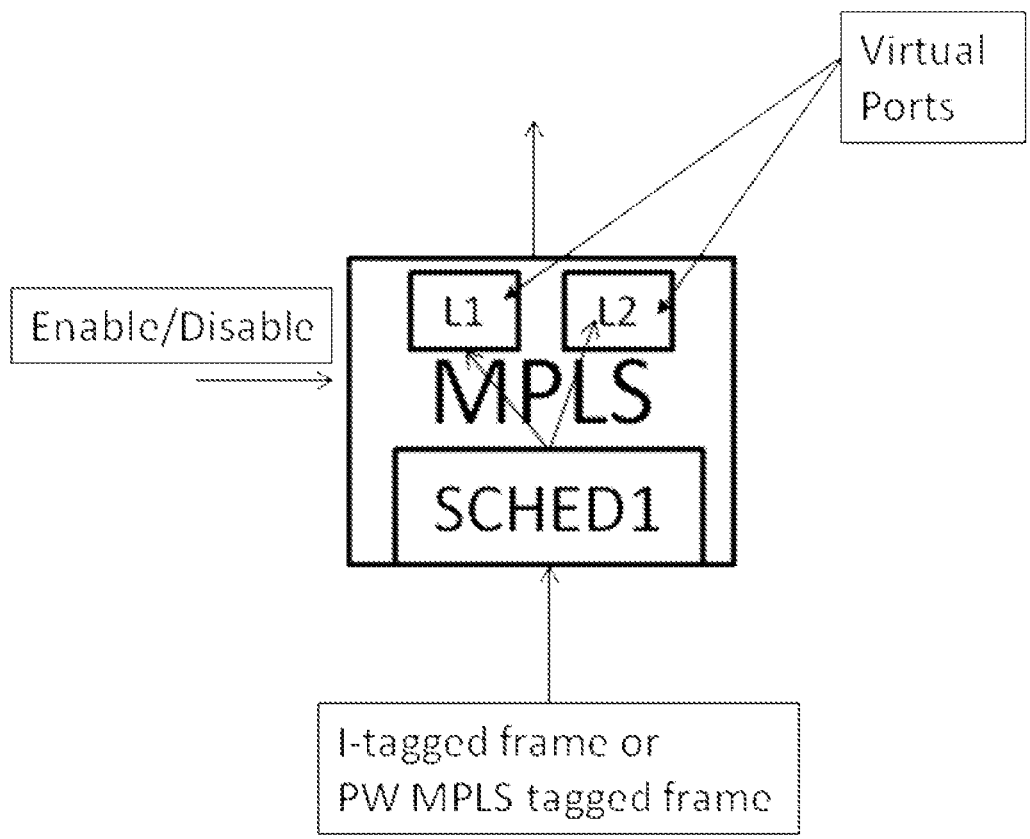
FIG. 4 is an exemplary diagram illustrating arrangements of enable/disable keys for selectively enable/disable the MPLS module of FIG. 3 depending on the network requirement, in accordance with an exemplary embodiment.
Figure 5:
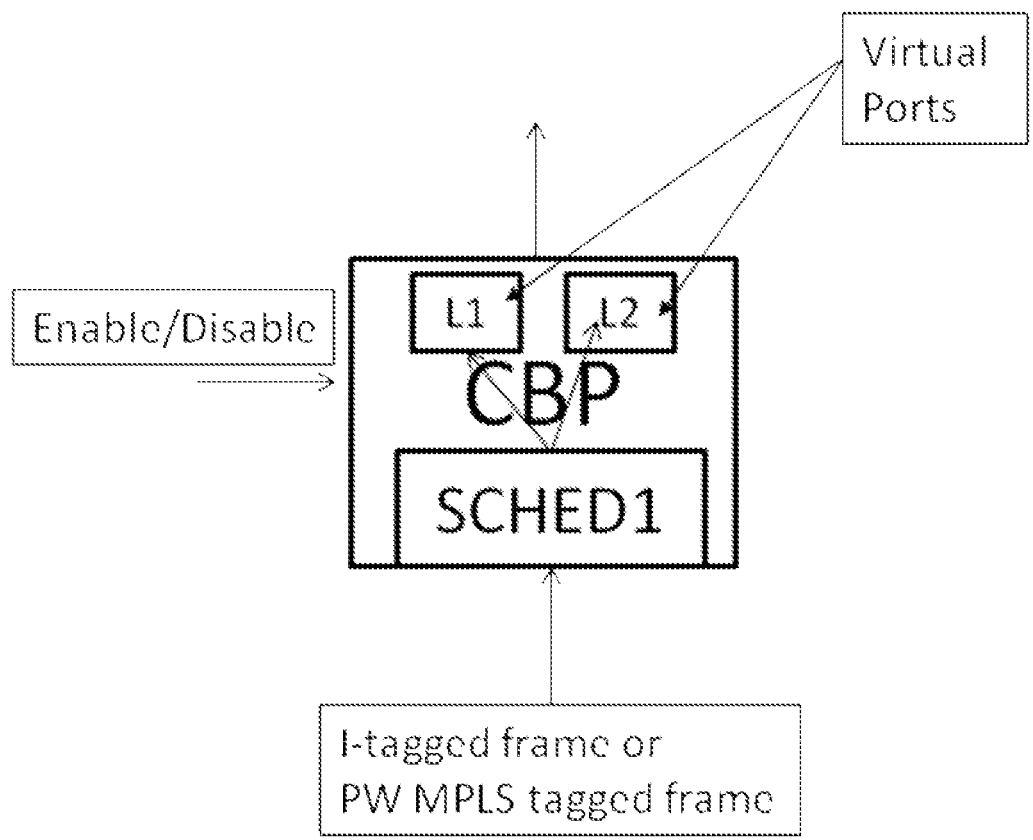
FIG. 5 is an exemplary diagram illustrating arrangements of enable/disable keys for selectively enable/disable the CBP module of FIG. 3 depending on the network requirement, in accordance with an exemplary embodiment.

In one embodiment, both MPLS module and CBP module can be arranged in the same architecture instead of separately as shown in FIGS. 1 and 2. The arrangement of said modules in the architecture is illustrated in the FIG. 3. Depending on the gateway requirement the MPLS module and/or CBP modules are selectively enabled or disabled as shown in FIGS. 4 and 5. For example, if the transmissions of the frames are carried out over PBB, then it is not necessary to use MPLS module. This is because the PBB understands the I-tagged frame and not required to tag the incoming frame with the MPLS label. Thus, CBP module is enabled (FIG. 5) and MPLS module is disabled. For example, if the transmission is happening over IP/MPLS edge network, it is required to enable MPLS module to tag the incoming frame with MPLS label. This is because the MPLS edge network understands only MPLS tagged frames. Otherwise it will drop all the incoming frames. Therefore, in this scenario MPLS module is enabled (FIG. 4) and CBP module is disabled. As already discussed, the scheduler distributes the incoming frames to appropriate virtual ports. Since CBP module is disabled, scheduler becomes in active. Therefore, in order to distribute the incoming frames to appropriate virtual ports, a new scheduler is provided within the MPLS module as shown in FIG. 3. Now this scheduler takes care of scheduling functions when CBP is disabled. Rest of the transmission processing is same as discussed in FIG. 1. Alternatively, a single scheduler is shared by both CBP and MPLS-TP module.

Figure 6:
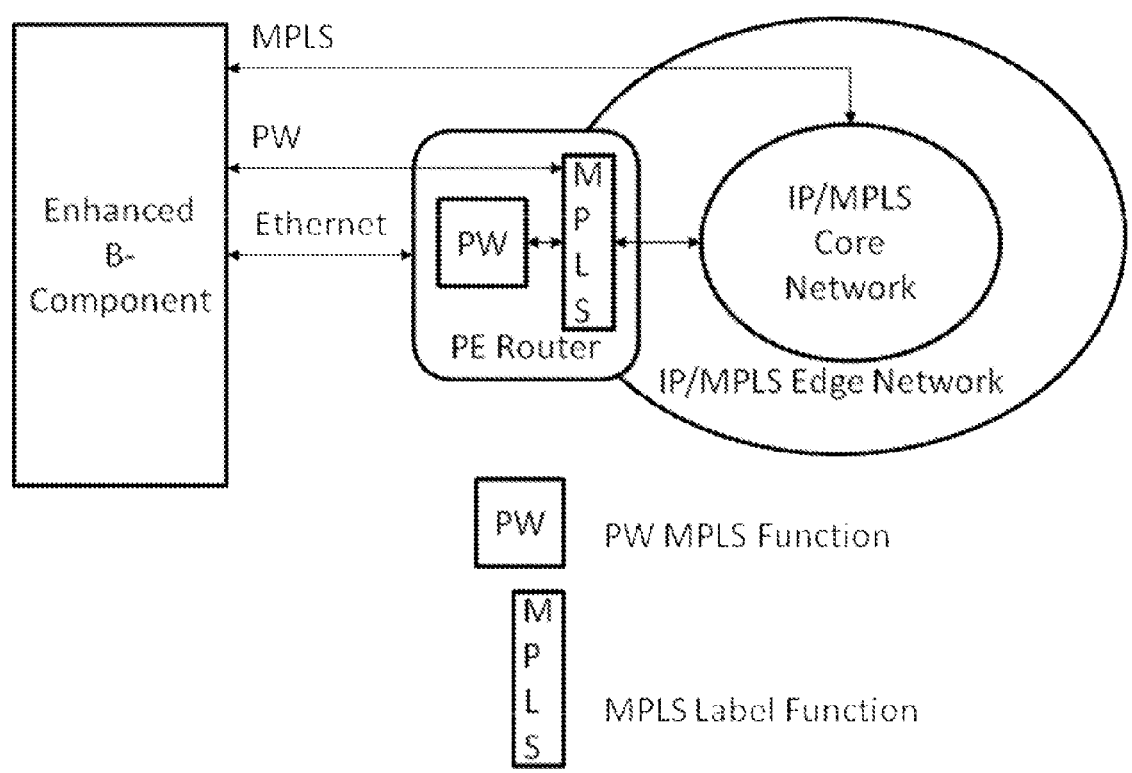
FIG. 6 is an exemplary diagram illustrating the interaction of exemplary embodiment with Provide Edge router and Provider router in an IP/MPLS network.

Referring now to FIG. 6, functionality of PW module and MPLS module is diagrammatically illustrated. It can be seen from the FIG. 6 that whenever the Ethernet frames transmitted in the IP/MPLS edge network, it passes through the PW MPLS module and MPLS module. This is because the MPLS core network understands only MPLS label tagged frames. If Ethernet frames are transmitted then it is tagged by the B-comp with PW and MPLS labels towards PE and same is removed away from the PE. In one embodiment, if the incoming frame is already tagged with PW label then it is not necessary to transmit the frames through PW module. Now, such kinds of frames are directly provided to MPLS module where MPLS labels are added to frames with PW label. The MPLS labeled frames are transmitted to IP/MPLS core network. However, if the incoming frame is already tagged with MPLS label, then it is directly transmitted to the MPLS core network as shown in FIG. 6.

The architecture model of the present disclosure provides various applications including, but not limiting to 1+1 data path protection to prevent packet loss, data aggregation for load sharing, TDM to Ethernet Circuit Emulation which will be explained in detail in the below description with reference to the figures.

Figure 7:
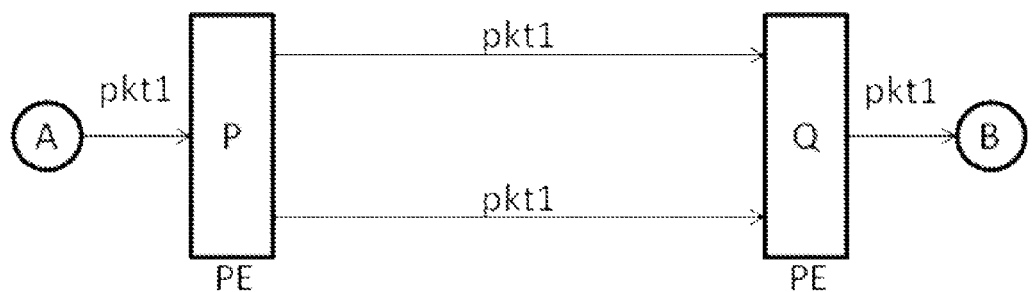
FIG. 7 is an exemplary diagram which illustrates 1+1 data-path of a customer network over a provider's network, in accordance with an exemplary embodiment.

Referring now to FIG. 7, a provider network with edge devices P and Q is sandwiched between two customer networks A and B. The customer requests the provider to run 1+1 data-path protection for their mission critical traffic to prevent packet loss. The traffic could be SCADA (Supervisory Control and Data Acquisition) traffic for computer system monitoring and controlling a process or control packets.

Packet pkt1 from A arrives at P. At P, two copies are made and sent towards Q. Node Q will send only one copy towards B. In the figure, 'pkt' abbreviates packet and could be frames in case of Ethernet. Pkt1 means it is one instance or type of packet. Pkt2 will be another instance of packet that is different from pkt1.

Figure 8:
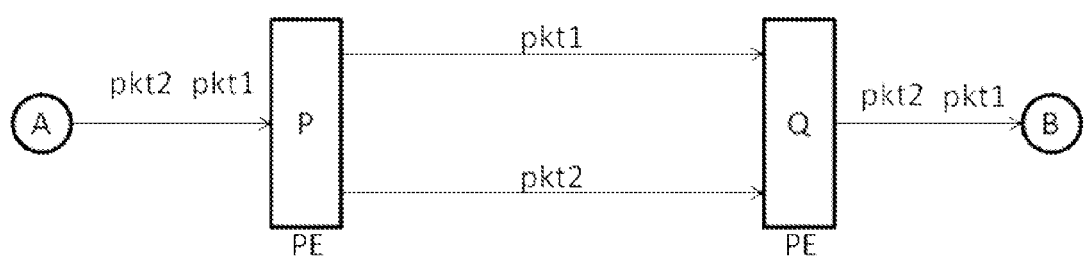
FIG. 8 is an exemplary diagram which illustrates data-path aggregation for load sharing, in accordance with an exemplary embodiment.

As illustrated in FIG. 8, Pkt1 and pkt2 are distributed between P and Q for load sharing. The link AP and QB are 1 Gbps capacity (e.g. 100 Gbps Ethernet) links. There could be multiple links feeding data traffic (also known as data aggregation) to node P amounting to 1 Gbps Capacity. However, in the figure only one link of capacity 1 Gbps feeding traffic to node P is shown. The links between P and Q are FE links (100 Mbps). Customer pumps 200 Mbps traffic into node P via 1 Gbps link which is then sent on the two access links combined.

In one embodiment, a number of scheduling algorithms including, but not limiting to RR (Round Robin), WRR (Weighted Round Robin), WFQ (Weighted fair queuing), DRR (Deficit Round Robin) are used for distribution purpose. For example, one could use DRR to perform load-sharing at byte granularity. Similarly, different scheduler offers different advantage. In this disclosure, for simplicity, Round Robin (RR) scheme has been assumed. Node Q reassembles the packets in sequential order and sends to B using the sequence number contained within the packet. Pkt1 and Pkt2 are regular Ethernet data frames. So there could be number of Ethernet switches between P and Q behaving as transparent switches to the load-sharing service.

FIGS. 9 and 11, illustrate an exemplary embodiment of the present disclosure. In particularly, FIG. 11 diagrammatically illustrate the individual components for converting high order TDM streams to Ethernet frames in which Node A and node B are TDM (Time division multiplex) source and receiver, respectively. Node P is TDM-Ethernet Interworking Function. TDM bit streams from the customer network A which are high bit rate streams are converted into low bit rate stream by TSP block (TDM Service Processor). The CES IWF (Circuit Emulation Service Interworking Function) takes the low order streams as the input and packages the bits first into a TDM payload and then into a CES payload by prefixing CES control word and I-tags. The I-SID uniquely identifies the destination IWF. The size of the payload is configurable depending on the processing capability of the CES IWF. The Control word will fragment the frames if frame is large and then adds a fragment ID and sequence number using the frame format specified in clause 6 of MEF 8.

The I-tag format is as provided below:
|PCP|DEI|UCA|RES_1|RES_2|ISID|
I-tag is of 32 bits:
3 bit for PCP (priority code point that enable prioritized service within same service)
1 bit DEI (Drop eligible indicator)
1 bit UCA (Use customer address)
1 bit RESERVE (RES_1)
2 bit RESERVE (RES_2); this reserve is different than the previous reserve bit. Frames are dropped if the 2 bits are non-zero.
24 bits ISID (Identifies the service)

ECDX block takes the CES payload and adds an identifier ECID. ECID identifies the type of Quality of service. The ECDX then prefixes Ethertype that tells the type of streams that is emulated.

EFTF takes the adapted payload created by ECDX and prefixes the Ethernet MAC addresses and creates an Ethernet Frame. EFTF also computes the Frame Check Sequence (FCS) to check for any bit errors.

The frame received by CP from LAN is an I-tagged frame. The frame format of I-tagged frame is:

|←Bit 0 . . .                                                                Last bit→|
|MAC address|MAC address|Ethertype of I-tag|I-tag|Payload|FCS|

The I-tagged packet is distributed over the two paths/tunnels between P and Q using appropriate scheduling mechanisms. Received packets are put in sequence at Q using the sequence numbers within the Control word.

FIG. 10 shows the application scenario of the present disclosure in which enhanced B-component (proposed architecture) is provided between the customer network and PBN or IP/MPLS edge network. The block B is a B-component bridge having CP and NP on the sender side network. There is also a B-component bridge with CP and NP on the receiver side network. The PW and MPLS-TP labels are added towards the sender side and removed away from receiver side by the B-component. All the functions such as load sharing, TDM emulation, 1+1 data path can be used in this application due to similar architecture and thus guarantee zero packet loss.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. An architecture for routing or switching data of a customer network over a provider's network in Provider Backbone Bridges (PBB) (IEEE 802.1Q) comprising:
    a Time Division Multiplexing (TDM) payload block in a Bridge component, the Bridge component including a relay, a customer port (CP) and a network port (NP), the TDM payload block configured for creating TDM payload;
    a Control Word (CW) block in the bridge component coupled with said TDM payload block and configured to receive the TDM payload internally through a bus or I-tagged frames externally through a LAN, and to process the received payload to form frames;
    an I-tag Translator block in the bridge component coupled with said CW block and configured to process the frames and change or generate I-tagged frames;
    a Customer Backbone Port CBP in the bridge component coupled with the I-tag translator and configured to add a B-VLAN tag to the frame;
    a Multi-Protocol Label Switching-Transport Profile (MPLS-TP) module coupled with the CBP and configured to add an MPLS-TP tunnel label to the frame; and
    a scheduler within the Customer Backbone Port (CBP) and coupled with the MPLS-TP module for scheduling the frames sent out from the CP through a plurality of virtual ports coupled with said CBP or said MPLS-TP module.

2. The architecture as claimed in claim 1, wherein optionally a single scheduler is shared by both the CBP and the MPLS-TP module and the single scheduler selectively enables or disables said CBP or said MPLS-TP module based on gateway requirements of the network.

3. The architecture as claimed in claim 1, wherein the CW block adds a Circuit Emulated Service (CES) control word to the received payload and fragments the frames with sequence numbers, if frame size is larger than the network can support.

4. The architecture as claimed in claim 1, wherein the I-tag translator block is configured for:
    translating the incoming I-SID and Priority Code Point (PCP) contained in the I-tag of the frame received from LAN,
    adding an I-tag and corresponding EtherType, if missing in the payload,
    mapping the I-tag and the corresponding EtherType to a Pseudowire (PW) Multi-Protocol Label Switching (MPLS) label and EtherType depending on gateway requirements.

5. The architecture as claimed in claim 1, wherein the architecture is capable of performing operations selected from a group comprising
    preventing packet loss in Σ n 1 data-path protection where n=2 . . . ∞ by creating duplicate copies of a packet, if MAC address derived from I-SID has group B-DA address, wherein each copy of group B-DA frame is sent to all those virtual ports that are part of said service identified by I-SID;
    scheduling of load arriving at an ingress port into a set of egress ports;
    enabling TDM to Ethernet circuit emulation by creating a fixed sized payload;
    tagging of the received payload with control word, I-tag and B-VLAN tag to the payloads;
    tagging of the received payload with control word, PW MPLS label and B-VLAN tag to the payloads; and
    tagging of the received payload with control word, PW MPLS label and MPLS label.

6. The architecture as claimed in claim 1, wherein the architecture includes a relay being adopted for filtering the frames and thereafter sending it out of Network Ports (NPs) that is provisioned to egress the corresponding Virtual Local Area Network (VLAN)-tagged or PW MPLS or MPLS labeled frames.

7. The architecture as claimed in claim 1, wherein the architecture facilitate plurality of applications selected from a group comprising Σ n 1 data path protection to prevent packet loss, data aggregation for load sharing, and TDM to Ethernet Circuit Emulation.

8. A method of routing or switching data of a customer network over a provider's network in Provider Backbone Bridges (PBBs), said method comprising:
    receiving, from a Time Division Multiplexing (TDM) payload block in a Bridge component, the Bridge component including a relay, a customer port (CP) and a network port (NP), TDM payload into a control word block in the bridge component internally through a bus, or I-tagged frames externally through a LAN, for adding Circuit Emulated Service (CES) control word to form frames;
    changing or adding I-tag and corresponding EtherType to the frames in an I-tag Translator block in the bridge component coupled with said CW block;
    prefixing Ethernet MAC addresses to the frames received from I-tag translator and forwarding it to a Customer Backbone Port (CBP) in the bridge component or a Multi-Protocol Label Switching-Transport Profile (MPLS-TP) module;
    mapping the I-tag to a Pseudowire (PW) MPLS label based on gateway requirements;
    scheduling the frames sent out from the CP through a plurality of virtual ports belonging to the CBP or the MPLS module or both; and
    filtering the frames and thereafter sending the filtered frames through Network Ports (NPs) that are provisioned to egress the corresponding VLAN-tagged or Labeled frames.

9. The method as claimed in claim 8, wherein the scheduling of the frames through the plurality of virtual ports is performed by a scheduler using appropriate scheduling algorithms selected from a group comprising Scheduler Processor (SP), Round Robin (RR), Weighted Round Robin (WRR), Weighted Fair Queuing and Deficit Round Robin (DRR).

10. The method as claimed in claim 8, wherein inserting a VLAN-tag or MPLS label corresponding to the virtual ports into the frames is carried out by the virtual ports of the CBP module or the MPLS-TP module.

\* \* \* \* \*